US012743674B2

(12) United States Patent
Biedron

(10) Patent No.: US 12,743,674 B2
(45) Date of Patent: Sep. 22, 2026

(54) VEHICLE INVENTORY MANAGEMENT AND DIGITAL TWIN SYNCHRONIZATION

(71) Applicant: Harman International Industries, Incorporated, Stamford, CT (US)

(72) Inventor: Marcin Biedron, Espoo (FI)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 52 days.

(21) Appl. No.: 18/739,172

(22) Filed: Jun. 10, 2024

(65) Prior Publication Data

US 2025/0378417 A1 Dec. 11, 2025

(51) Int. Cl.

*G06Q 10/087* (2023.01)
*G06F 8/65* (2018.01)
*G07C 5/00* (2006.01)

(52) U.S. Cl.

CPC ............ *G06Q 10/087* (2013.01); *G06F 8/65* (2013.01); *G07C 5/008* (2013.01)

(58) Field of Classification Search

CPC ..... G06Q 10/087; G06F 8/65; G06F 11/3668; G06F 2201/86; G06F 11/3013; G06F 11/3055; G06F 30/20; G07C 5/008; G07C 5/085; G06N 20/00; G06N 3/08

See application file for complete search history.

(56) References Cited

U.S. PATENT DOCUMENTS 11,200,535 B1 * 12/2021 Greenbaum .......... H04W 4/021
2021/0390498 A1 * 12/2021 Ohlsson ................. G06N 20/00
2022/0048468 A1 * 2/2022 Bucheleres ........... B60R 25/102
2023/0094805 A1 * 3/2023 Sharma ............. B60W 50/0098 717/172
2023/0169805 A1 * 6/2023 Ramnani ................ G07C 5/008 701/29.3

(Continued)

FOREIGN PATENT DOCUMENTS

AU 2022471658 A1 * 3/2025 ............. G06N 20/00
WO 2023066508 A1 4/2023

OTHER PUBLICATIONS

Deng, S. et al., "A systematic review on the current research of digital twin in automotive application," Internet of Things and Cyber-Physical Systems, vol. 3, Apr. 23, 2023, 12 pages.

(Continued)

*Primary Examiner* — Garcia Ade
(74) *Attorney, Agent, or Firm* — McCoy Russell LLP

(57) ABSTRACT

Systems and methods are provided for inventory management and digital twin synchronization. In one example, an inventory management system includes a machine, an active monitoring service configured to monitor the machine, detect active triggering events, and notify a client of the machine of passive triggering events, wherein the client is configured to initiate a partial or full inventory collection in response to receiving notification of an active triggering event. The inventory management system further includes a server external to the machine and communicatively coupled to the client via over the air (OTA) connection, and a digital twin, wherein the digital twin is a digital replica of the machine synchronized to the machine via the server by data collected from the partial inventory collection or the full inventory collection.

8 Claims, 7 Drawing Sheets

(56) References Cited

U.S. PATENT DOCUMENTS

2024/0362561 A1* 10/2024 Ezrielev ........... G06Q 10/06316

OTHER PUBLICATIONS

Alghamdi, W. et al., "Synchronization Patterns for Digital Twin Systems," Journal of Applied Data Sciences, vol. 5, No. 3, Sep. 2024, 12 pages.

European Patent Office, Extended European Search Report Issued in Application No. 25178130.8, Oct. 31, 2025, Germany, 9 pages.

* cited by examiner

VEHICLE INVENTORY MANAGEMENT AND DIGITAL TWIN SYNCHRONIZATION

TECHNICAL FIELD

The present description relates generally to systems and methods for inventory management and digital twin synchronization.

BACKGROUND

Inventory management systems may be used to monitor a state of a system and an assembly, machine for example, to prepare an appropriate software update package. The system and assembly may be the software and hardware, respectively, for a machine. The machine may be a vehicle. Some inventory management systems may generate and maintain a digital twin to represent a current state of the machine including the system and assembly as a data replica. For example, the digital twin may be used by an original equipment manufacturer (OEM) to simulate software updates, and provide maintenance demand predictions.

Conventional implementations of inventory management systems may lack real-time monitoring of systems of the machine, leading to delayed detection and response to system changes. Instead, batch collection of a full inventory may be performed in response to pre-determined events such as startup, user input, or an event on a pre-determined schedule. For example, manually initiated inventory management systems may be time-consuming for a user and error-prone. In another example, scheduled inventory assessment may delay detection of an event occurring during an interval between the scheduled times.

Asynchronous inventory data updates to a digital twin may result in inaccurate representations of the machine, thereby reducing effectiveness of simulations, analytics, and diagnostics performed on the digital twin. Further, without continuous monitoring and real-time data updates, predictive maintenance capabilities may be hindered, leading to increased operational and maintenance costs. Further still, without automatic mechanisms for optimizing inventory collection, inventory management systems may collect a full inventory without knowledge of what has changed since a prior inventory collection, rather than a partial inventory including only changes in inventory. Thus, gathering a full inventory collection for every inventory update may be resource intensive, consuming substantial network bandwidth and computing resources. Additionally, inventory management systems and software updates may run while the machine is not in use. Thus, in examples where the machine includes a battery, battery life may impose energy limitations that current inventory management systems may exceed.

SUMMARY

The inventors have recognized the previously mentioned issues and have developed systems and methods to at least partially address the above issues. In particular, the inventors have developed system, comprising: a machine; an active monitoring service configured to monitor the machine, detect active triggering events, and notify a client of the machine of active triggering events, wherein the client is configured to initiate a partial or full inventory collection in response to receiving notification of an active triggering event; a server external to the machine and communicatively coupled to the client via over the air (OTA) connection; and a digital twin, wherein the digital twin is a digital replica of the machine synchronized to the machine via the server by data collected from the partial or full inventory collection.

In this way, the automated inventory management system may provide continuous monitoring of system parameters, enabling timely detection of changes and swift response. The real-time or near real-time update of inventory information to the digital twin may improve accuracy of the reflection of the current state of the machine, thereby enhancing the value and utility of the digital twin technology. For example, predictive maintenance capability may be increased due to synchronization of the digital twin, aiding in timely maintenance actions and reducing operational costs. Additionally, more rapid response to unauthorized changes made to the machine with continuous monitoring of the active monitoring service may also enhance security. Moreover, the ability to collect partial inventory may conserve network bandwidth (e.g., in-vehicle network bandwidth) and computing resources. The inventory management system may be compatible with a variety of container orchestration platforms, making it applicable to various machine types. Further, integration of machine learning and container management may prepare the machine for future technologies and methodologies (e.g., software updates). Further still, the inventory management system may be deployed in a modular fashion, allowing for incremental implementation and scalability based on the machine's or fleet's (e.g., plurality of machines such as a fleet of vehicles) demands and configuration. Overall, the inventory management system disclosed herein may ensure accurate and efficient management of hardware, software, and containerized environments within the machine's computing infrastructure and provide a centralized repository for data in the cloud.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The disclosure may be better understood from reading the following description of non-limiting embodiments, with reference to the attached drawings, wherein below.

DETAILED DESCRIPTION

The following description relates to systems and methods for inventory management and digital twin synchronization. In one or more embodiments the inventory management system comprises a machine and an active monitoring service configured to monitor the machine, detect active triggering events, and notify a client of passive triggering events, wherein the client of the machine is configured to initiate a partial or full inventory collection in response to receiving notification of an active triggering event. The inventory management may further include a server external to the machine and communicatively coupled to the client via over the air (OTA) connection and a digital twin, wherein the digital twin is a digital replica of the machine updated in real-time or near-real-time via the server by data collected from the partial inventory collection or the full inventory collection.

Figure 1:
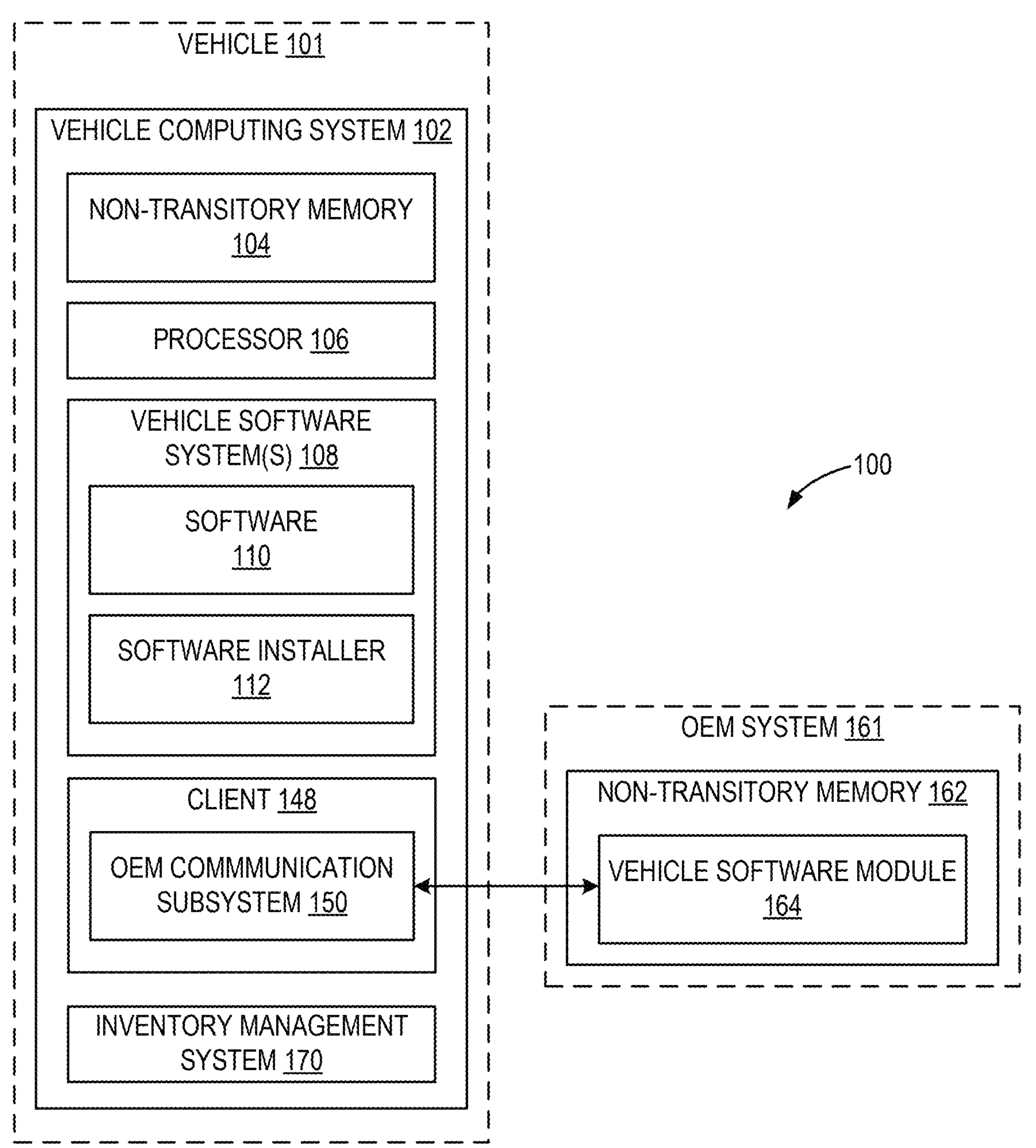
FIG. 1 shows an exemplary software update system, in accordance with one or more embodiments of the present disclosure.
Figure 2:
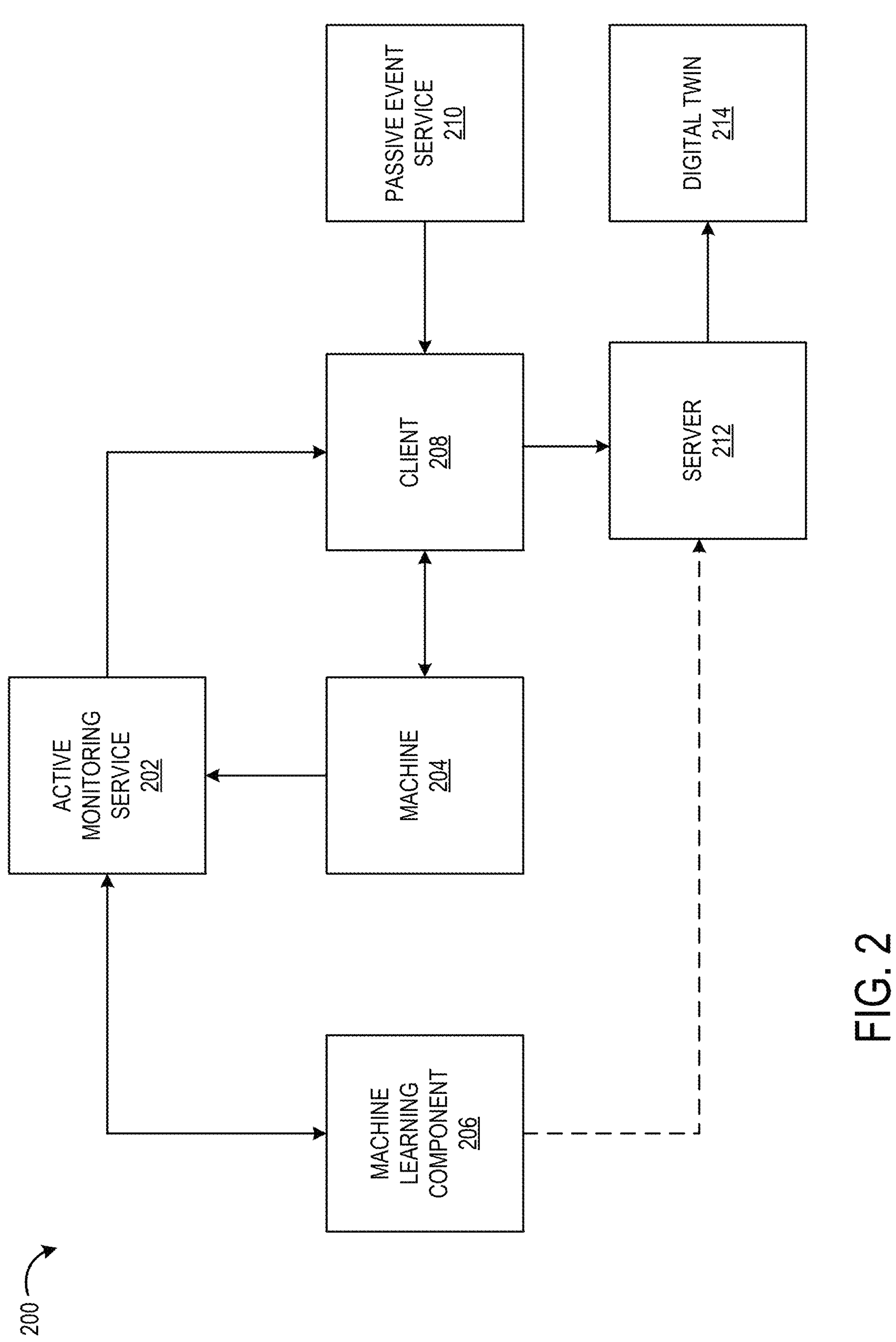
FIG. 2 shows an exemplary inventory management system, in accordance with one or more embodiments of the present disclosure.
Figure 3:
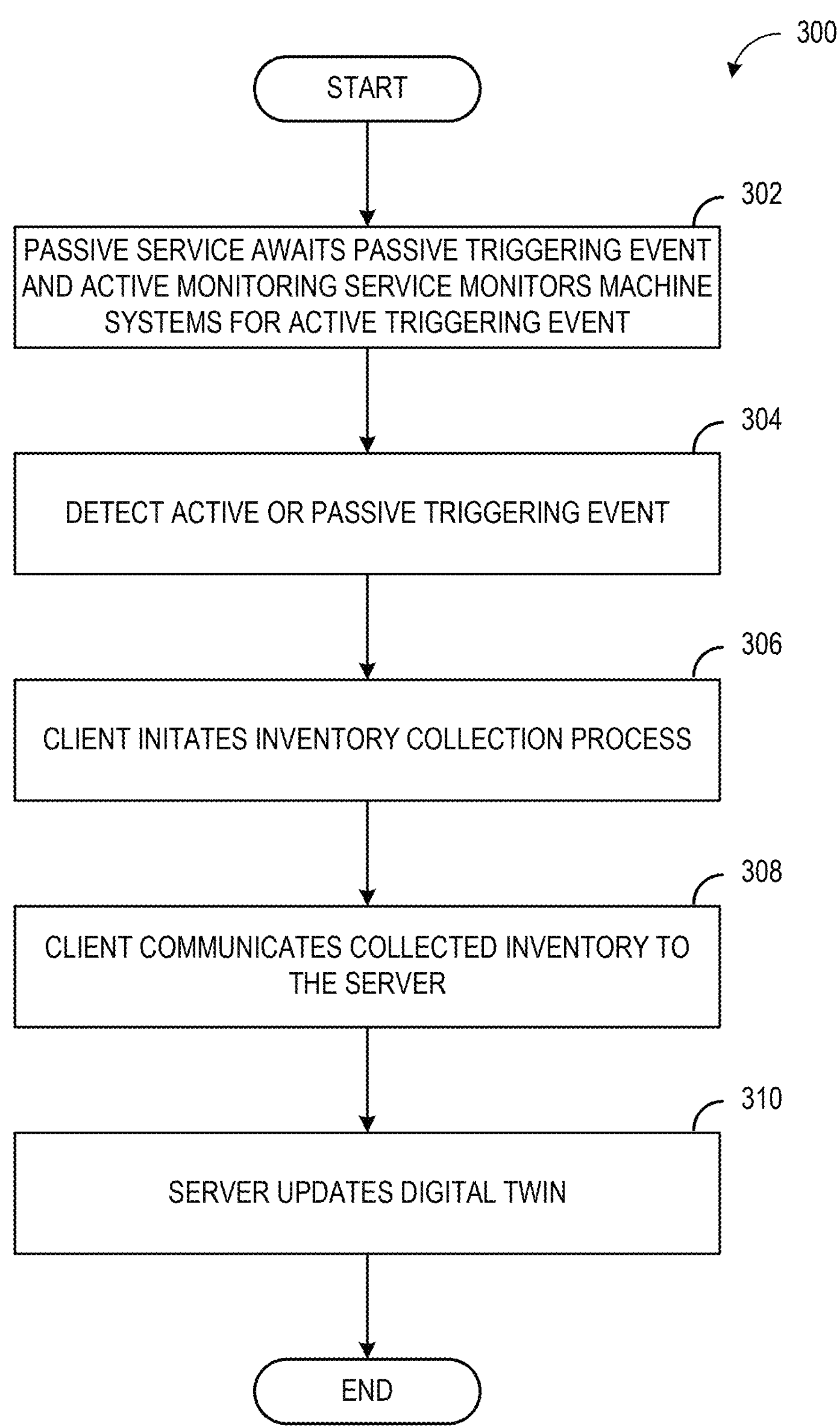
FIG. 3 shows a flowchart of an exemplary method for implementing an inventory management system, in accordance with one or more embodiments of the present disclosure.
Figure 4:
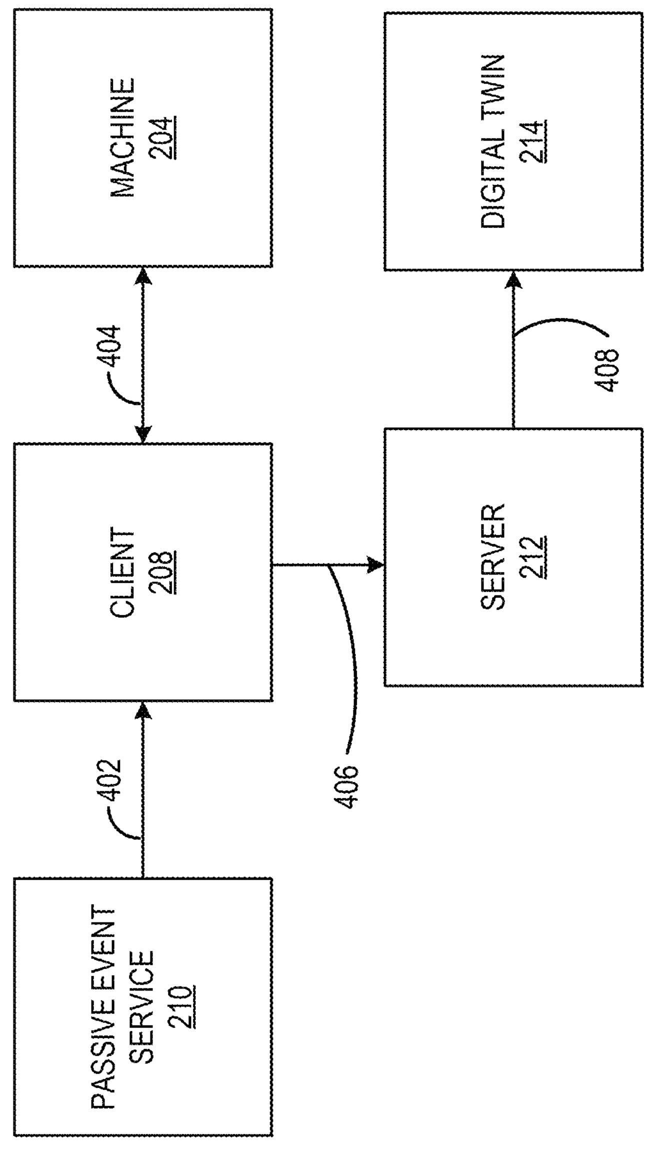
FIG. 4 shows a passive portion of the inventory management system, in accordance with one or more embodiments of the present disclosure.
Figure 5:
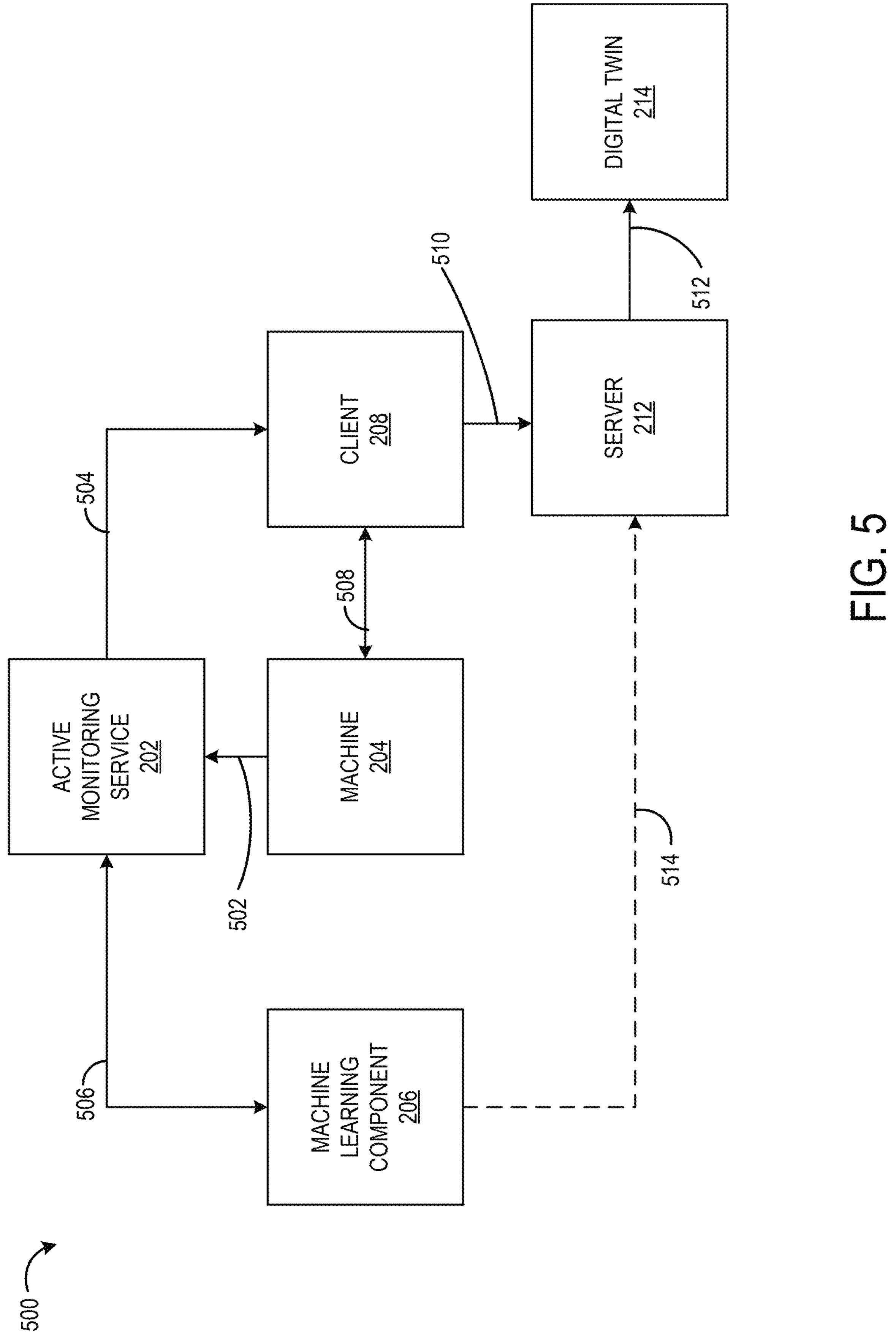
FIG. 5 shows an active portion of the inventory management system, in accordance with one or more embodiments of the present disclosure.
Figure 6:
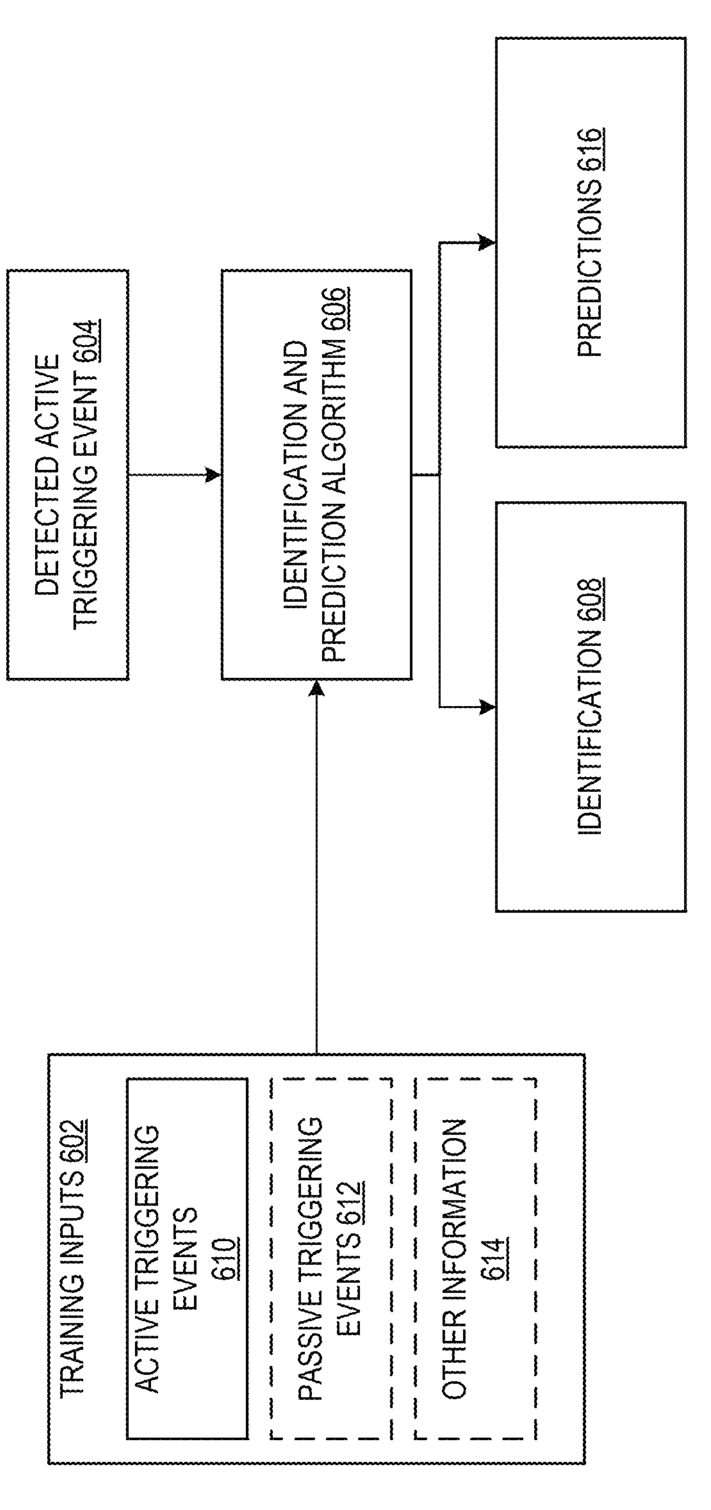
FIG. 6 shows an example machine learning component, in accordance with one or more embodiments of the present disclosure.
Figure 7:
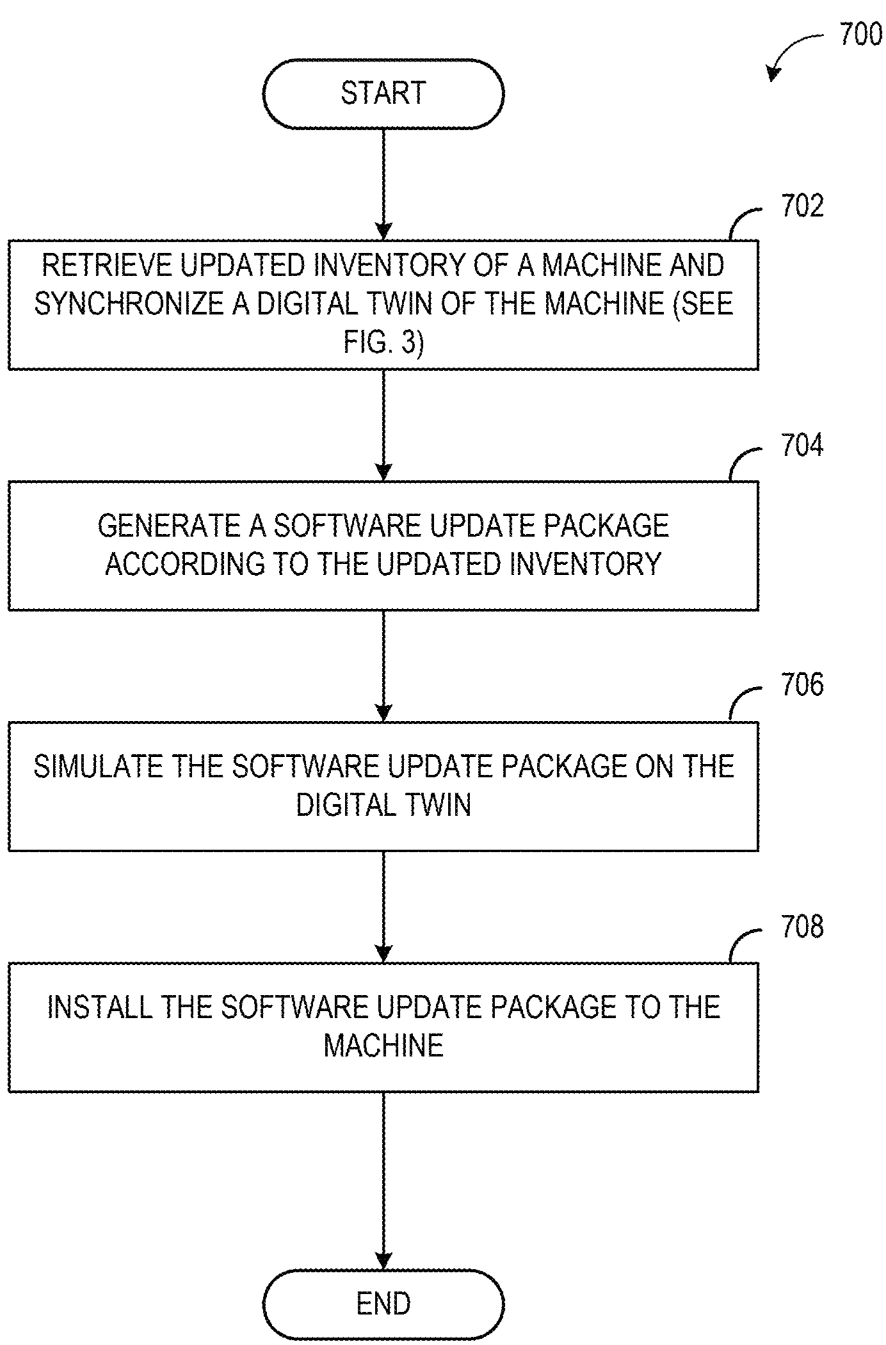
FIG. 7 shows a flowchart of a method for updating software of a machine according to inventory collected by the inventory management system, in accordance with one or more embodiments of the present disclosure.

FIG. 1 shows an exemplary software update system, in accordance with one or more embodiments of the present disclosure. FIG. 2 shows an example inventory management system, in accordance with one or more embodiments of the present disclosure. For example, the inventory management system of FIG. 2 may be implemented to identify real-time changes in vehicle software and hardware in order to prepare appropriate software update packages (e.g., new features, set of binaries, containers, configurations, instructions for applying the update, pre-conditions related to the update, and the like) deliverable by a vehicle software update system shown in FIG. 1. FIG. 3 shows an example of a method by which the system of FIG. 2 may manage inventory and synchronize the digital twin in real-time with an active monitoring service and a passive event service. FIG. 4 shows an example of a passive portion of the inventory management system and FIG. 5 shows an example of an active portion of the inventory management system. FIG. 6 shows an example of a machine learning component of the inventory management system. FIG. 7 shows a flowchart of a method by which a software update system, such as the software update system of FIG. 1, may utilize the inventory management system to update software.

It is to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIG. 1 shows a vehicle software update system 100, including a vehicle computing system 102 of a vehicle 101. The vehicle 101 may be a car, a bus, a truck, or a different type of machinery or vehicle operated by an operator. The vehicle 101 may be a passenger car, bus, or truck, for some examples. Further, it should be appreciated that other types of vehicles may use the inventory collection system disclosed herein without departing from the scope of this disclosure. Further still, other machines or equipment other than vehicles may implement the inventory collection system disclosed herein without departing from the scope of the present disclosure.

Vehicle computing system 102 includes one or more processors 106 configured to execute machine readable instructions stored in non-transitory memory 104. Memory 104 and other memory referred to herein may include one or more data storage structures, such as optical memory machines, magnetic memory machines, or solid-state memory machines, for storing programs and routines executed by processor(s) 106 to carry out various functionalities disclosed herein. Memory 104 may include any desired type of volatile and/or non-volatile memory such as, for example, static random access memory (SRAM) dynamic random access memory (DRAM), flash memory, read-only memory (ROM), and/or the like.

Processor(s) 106 and other processors referred to herein, may be any suitable processor, processing unit, or microprocessor, for example. Processor(s) 106 may be a multiprocessor system, and may include one or more additional processors that are identical or similar to each other and that are communicatively coupled via an interconnection bus. Processor(s) 106 may be single core or multi-core, and the programs executed thereon may be configured for parallel or distributed processing. In some embodiments, processor(s) 106 may optionally include individual components that are distributed throughout two or more machines, which may be remotely located and/or configured for coordinated processing. In some examples, one or more aspects of processor(s) 106 may be virtualized and executed by remotely-accessible networked computing machines configured in a cloud computing platform.

Vehicle computing system 102 may include one or more vehicle software systems 108. The vehicle software systems 108 may each include software 110. The software 110 may be stored in non-transitory memory 104 and may comprise instructions for executing programs, algorithms, and the like in order to control, manage, and respond to various systems of the vehicle, such as battery management systems, thermal management systems, and more. The software 110 as stored in memory may be a currently uploaded or downloaded version of operating software specific to the vehicle. For example, the type of vehicle, including make, model, year, and the like, may inform the operating software options available for the vehicle computing system 102.

The software 110 may comprise firmware, operating software, applications, services, and/or vehicle configuration data. The software 110 may be updatable. For example, a software installer 112 may be included in the one or more vehicle software systems 108. The software installer 112 may be configured to install a different, often newer version of the software. Typically, the software installer 112 enables software reflashing from external tools at a service provider (e.g., dealership service facility, maintenance facility, etc.). The external tools herein referenced may be diagnostic tools that utilize protocols like unified diagnostic services (UDS). The newly installed software may replace an existing software. For example the newly installed software may replace the software 110 that is stored in memory. The one or more vehicle software systems 108 may be configured with various methods for installing software. For example, the one or more vehicle software systems 108 may be configured for direct installation, whereby a source of the new operating software is connected via a dedicated data cable (e.g., an Ethernet cable) or other type of data channel. Additionally or alternatively, one or more vehicle software systems 108 may be configured for remote installation, for example via wireless communication such as via WiFi communication, vehicle-to-everything (V2X) communication, cellular data communication, or other type of wireless communication. Over the air (OTA) technology allows for remote delivery of software updates, including for example bug fixes, security patches, and new features, to vehicles without demanding that the vehicle be brought to a service station for software update.

The vehicle computing system 102 may further comprise a client 148. The client 148 may be configured for one or more types of communication via OTA programming or wired connection. The client 148 may comprise one or more subsystems. For example, the client 148 may comprise an OEM communication subsystem 150. The OEM communication subsystem 150 of the client 148 may be configured to communicate with the OEM system 161.

The OEM system 161 may comprise a vehicle software module 164 stored in non-transitory memory 162. The non-transitory memory 162, similar to other non-transitory memories herein described, may include one or more data storage structures, such as optical memory machines, magnetic memory machines, or solid-state memory machines, for storing programs and routines executable by a processor. The vehicle software module 164 may include a plurality of operating system software configurations for a plurality of vehicles, including both currently used software and software updates.

The OEM communication subsystem 150 may be configured to communicate with the OEM system 161, specifically with the vehicle software module 164, in order to retrieve software update(s) for a given vehicle. The vehicle software update system 100 may employ a vehicle inventory management system in accordance with the present disclosure to prepare software updates. One or more components of an inventory management system 170 may be included in the vehicle computing system 102. However, other components of the inventory management system 170 may be external to the vehicle 101, for example a remote machine such as server. Software updates generated at the OEM system 161 may be tailored to a current state of the vehicle 101 monitored by the vehicle inventory management system 170. In this way, an appropriate update to the software 110 may be made, according to the current state of the software 110, and other components of the vehicle 101 (e.g., hardware).

Turning to FIG. 2, an example of an inventory management system 200 in accordance with one or more embodiments of the present disclosure is shown. The inventory management system 200 may manage inventory of a machine 204 (e.g., the vehicle 101 of FIG. 1) and synchronize a digital twin 214 to the machine 204. As described above, the inventory management system 200 may include components (e.g., services) both within a computing system of the machine 204 (e.g., the vehicle computing system 102 of FIG. 1) and external to the machine 204 (e.g., remote server, cloud, etc.).

A client 208 may initiate inventory collection of the machine 204 and communicate the collected inventory data to a server 212. The client 208, such as the client 148 of FIG. 1, may be an OTA client in at least some examples. The client 208 may additionally or alternatively be adapted for communication of data via a wired connection. The server 212 may be an external entity configured to receive and store updated inventory information. In this way, the server 212 may provide a centralized repository for storing inventory data. The server 212 may be external to the machine 204 and communicatively coupled to the client via OTA connection.

The client 208 may include one or more interfaces, depending on an architecture of the machine 204. The client 208 may trigger UDS commands and/or other communication protocols to retrieve data from systems of the machine 204.

The client 208 may initiate inventory collection in response to a triggering event The triggering event may be either a passive triggering event or active triggering event. The inventory management system 200 may include a passive event service 210 awaiting predefined passive triggering events such as machine startup, key-on events, scheduled checks, or external triggers. Upon occurrence of a passive triggering event, the passive event service 210 may communicate the passive triggering event to the client 208, prompting full inventory collection. Due to the predetermined nature of passive triggering events, the passive triggering event may or may not indicate a type of change from current inventory. In other words, in at least some examples, the passive triggering event may trigger inventory collection without knowledge of what differs between the current inventory and the collected inventory intended to replace the current inventory. Due to a lack of knowledge on the changes, full inventory collection may include compiling all available inventory data on all machines and systems of the machine computing system, including software, hardware, and container configurations. As described above, initiating full inventory collection by passive triggering events may be inefficient due to collection of data that remains the same after updating (e.g., unchanged states). Further, the passive nature of passive triggering events may result in delayed update of inventory according to changes in systems of the machine 204. A process of responding to a passive triggering event with the inventory management system 200 is described further below in regards to FIG. 4.

Thus, the inventory management system 200 may further include an active monitoring service 202 configured to monitor the machine, detect active triggering events, and notify a client of active triggering events. For example, an active triggering event may be a change to a system of the machine 204. Thus, the active triggering service may communicate specifically what the change is and a partial inventory collection may be performed by the client 208 accordingly. The client 208 may be configured to initiate a partial or full inventory collection in response to receiving notification of an active triggering event. A partial inventory collection may be more efficient than a full inventory collection due to targeted capturing of inventory updates (e.g., only inventory data which has changed) with less computing power and/or memory, thus reducing bandwidth use for inventory collection. In some examples, an active triggering event may also initiate a full inventory collection, depending on the type of active triggering event.

The active monitoring service 202 may continuously or periodically monitor the machine 204 to detect changes in hardware, software, or container configurations in real-time or near real-time. Periodically may refer to monitoring with shorter intervals between monitoring than between passive triggering events. For example, the active monitoring service 202 may monitor random-access memory (RAM), controller area network (CAN) traffic and events, free memory space, network traffic, systems performance, configuration files, databases, logs or trace data, triggering event logs, file systems, and the like. Parameters monitored by the active monitoring service 202 may be customized, catering to the specific demands of different machine systems or operational conditions. As such, the active monitoring service 202 may monitor any relevant systems of the machine 204 without departing from the scope of the present disclosure. For example, the active monitoring service 202 may be part of the computing system of the machine 204 or external to the machine 204 without departing form the scope of the present discloser. Likewise, any other components in FIG. 2 may be part of the machine 204 computing system or external to the machine 204.

While the passive event service 210 may not be able to identify changed or redundant data, the active monitoring service 202 may pinpoint a specific change, causing the client 208 to request data from the machine 204 relevant to the specific change. Thus, the active monitoring service 202 may increase efficiency of inventory collection and management. A process of responding to an active triggering event is described further below in regards to FIG. 5.

The inventory management system 200 may also include a machine learning component 206 to aid the monitoring capability of the active monitoring service 202, as described further below in regards to FIG. 6. The machine learning component 206 may be configured to learn from the active triggering events and provide a model for the active monitoring service to optimize monitoring according to a current state of the machine, bandwidth, and computing power. The machine learning component 206 may be a variety of machine learning models without departing from the scope of the present disclosure. The machine learning component 206 may learn from inventory updates to produce a model for facilitating anomaly detection and performing advanced analytics to enhance monitoring accuracy and predict potential changes in the inventory. The machine learning component 206 may participate in a feedback loop with the active monitoring service 202 to learn what information may be updated under different circumstances. In some examples, the machine learning component 206 may also communicate with the server 212. The machine learning component is described further in regards to FIG. 6 below.

The inventory management system 200 may further include a digital twin 214. The digital twin 214 may be a digital replica of the machine 204. The digital twin may be updated in real-time or near real-time with the inventory information communicated to the server 212 from the client 208, as described above. Thus, the digital twin 214 may be a digital replica of the machine 204 synchronized to the machine 204 via the server 212 by data collected from partial and full inventory collections. An OEM such as the OEM system 161 may utilize the digital twin 214 to simulate a software update, for example. The digital twin 214 may be accessible by more than one OEM in some examples. The digital twin 214 may utilize any appropriate digital twin technology capable of replicating the monitored machine systems in digital format.

The client 208 may interact with (e.g., respond to) both passive triggering events received by the passive event service 210 and active triggering events received by the active monitoring service 202. In this way, real-time or near real-time updates may be made to the machine inventory and the digital twin 214, thereby increasing accuracy of the digital twin 214.

Turning to FIG. 3, an example of a method 300 for implementing an inventory management system (e.g., the inventory management system 200 of FIG. 2) in accordance with one or more embodiments of the present disclosure is shown as a flowchart. The inventory management system may employ both a passive event service and an active monitoring service as described above with regards to FIG. 2 to update machine inventory in real-time or near real-time and minimize network traffic associated with inventory collection. The method 300 may be performed at least in part by a machine's computing system such as the vehicle computing system 102 of FIG. 1, in order to collect and update machine inventory and synchronize a digital twin of the machine in real-time or near real-time. An external server communicatively coupled to the computing system of the machine may also participate in executing the method 300.

The method 300 begins at 302, wherein the passive event service awaits a passive triggering event (e.g., startup, scheduled check, key-on event, etc.) from the machine or external systems and concurrently, the active monitoring service monitors machine systems for an active triggering event (e.g., a change in hardware, software, or container configuration). The active monitoring service may utilize a machine learning component for enhanced detection.

The method 300 proceeds to 304, wherein an active triggering event or a passive triggering event is detected. If a passive triggering event is detected, the passive event service may notify the client that a passive triggering event has been observed. The inventory management process upon occurrence of a passive triggering event is described in greater detail in regards to FIG. 4 below. If an active triggering event is detected, the active monitoring service may notify the client of the occurrence and type of change detected. The inventory management process upon detection of a passive triggering event is described in greater detail in regards to FIG. 5 below.

In response to detection of an active or passive triggering event at 304, the method 300 proceeds to 306, wherein the client initiates an inventory collection process. Notification of the passive triggering event may trigger a full inventory collection as the passive triggering event is not related to a change in inventory. Notification of the active triggering event may trigger a partial inventory collection according to the detected change. The client may request the full or partial inventory data from the various machine systems and machines. A full inventory collection may provide data from all available systems and machines, while a partial inventory collection may provide data from a portion of the systems and machines. Therefore, a partial inventory collection may comprise less data than a full inventory collection, conserving bandwidth and computing power, therein increasing the efficiency of computational operations. Likewise, the partial inventory collection may reduce power consumption, as less computing power may be desired or requested for the partial inventory collection. Additionally, the ability to perform both partial and full inventory collections may allow for more granular updates to the inventory, further reducing the load (e.g., computing power demands) on machine systems.

The method 300 proceeds to 308, wherein the client communicates the collected inventory data to the server. The client may determine an extent of inventory collection. A larger amount of data may be transferred for full inventory collections than partial inventory collections. Thus, by creating partial inventory updates based upon detected changes (e.g., active triggering events), redundancy may be reduced, thereby increasing efficiency of computational operations. The client may also prioritize inventory collection data from partial inventory collections. For example, inventory data changes of greater immediate pertinence to the machine may be assigned a higher importance than inventory changes with lower effect on the machine. In this way, inventory data may be prioritized intelligently to ensure aspects of the machine systems with the greatest effect (e.g., on digital twin simulation and analysis) are updated to reflect the current state of the machine.

The method 300 proceeds to 310, wherein the server updates the digital twin. Updating the digital twin according to information gathered in response to both passive triggering events and active triggering events may increase accuracy of synchronization between the actual machine state and its digital twin. Synchronization between the machine and the digital twin may enhance predictive maintenance, analytics, and diagnostics using the digital twin.

The method 300 ends after 310. The method 300 is one exemplary embodiment of implementing an inventory management system of the present disclosure. As such, other embodiments may include additional steps without departing from the scope of the present disclosure.

Turning to FIG. 4, a passive portion 400 of the inventory management system 200 of FIG. 2 is shown. The passive portion 400 may implement the method 300 of FIG. 3 in response to a passive triggering event detected by the passive event service 210. The passive event service 210 may notify the client 208 of the passive triggering event, as indicated by arrow 402. Upon receiving notification of the passive triggering event, the client 208 may request information from the machine 204, and the machine 204 may respond by sending the requested information to the client 208, as indicated by arrow 404. After receiving the requested information, the client 208 may communicate the requested information to the server 212, as indicated by arrow 406. Finally, the server 212 may use the requested information to update the digital twin 214 to reflect the current state of the machine 204, as indicated by arrow 408. As described above, the process of collecting inventory according to a passive triggering event may occur less often than changes are made to the machine. Thus, the passive event service 210 may provide less efficient data collection due to gathering and processing inventory that has not changed. However, the passive event service 210 may ensure full inventory is collected periodically, thereby ensuring updates are made to inventory of all aspects of the machine 204 in the case that the active monitoring service 202 of FIGS. 2 and 5 may not monitor all the systems of the machine 204 or some changes are not detected by the active monitoring service 202.

Turning to FIG. 5, an active portion 500 of the inventory management system 200 of FIG. 2 is shown. Some components of the inventory management system 200 may be part of both the passive portion 400 and the active portion 500. The active portion 500 may execute the method 300 of FIG. 3 in response to an active triggering event, wherein the active triggering event is a change in a monitored machine system. The active monitoring service 202 may continuously or periodically monitor the machine 204 as indicated by arrow 502. When a change is detected, the active monitoring service 202 may notify the client 208 of the active triggering event as indicated by arrow 504. Further, as indicated by arrow 506, the machine learning component 206 may aid the active monitoring service in identifying the detected change by providing a model, and the detected change may be fed as training input to the machine learning component 206.

In some examples, to further increase efficiency of computational operations and decrease bandwidth demands of inventory collection, two or more changes may comprise a single active triggering event. Thus, an active triggering event may comprise one or more changes since a prior inventory collection in one or more of hardware, software, or containers of the machine. In other words, the active monitoring service 202 may delay notifying the client 208 of a first change until one or more subsequent changes have occurred. The number of changes accumulated before notifying the client of the active triggering event comprising the changes may depend on what system(s) experienced the changes, for example. The number of changes may also depend on states of other systems. For example, inventory collections may be optimized to reduce bandwidth demands according to other systems' usage of bandwidth.

The machine learning component 206 may identify parameters, such as an optimal number of changes accrued before notifying the client of the changes (e.g., active triggering event), what inventory items are relevant to the changes, and whether a partial or full inventory collection may be performed as a result. The machine learning component 206 may take into account the type of change and current state of various systems of the vehicle.

For example, a recommended response from the machine learning component 206 may differ when the machine 204 is connected to a wireless machine OTA (e.g., a cellular phone) due to increased bandwidth demand. For another example, machine connectivity may affect inventory collection, such as when the machine is connected to a network with limited bandwidth, or the usage is expensive. In such an example, the inventory data updates may be prioritized and lower priority data updates may be delayed to conserve bandwidth. Prioritization rules may be predefined and/or learned by the machine learning component 206.

Further, the machine learning component 206 may analyze previous patterns of sequential changes and corresponding states of the machine 204 to predict active triggering events. In this way, the active monitoring service 202 may be alerted to monitor a specific system in response to a prediction that a change may occur in the specific system. As an example wherein the machine includes a heating, ventilation, and air conditioning (HVAC) system, fluctuations in temperature controls or different than expected behavior in correspondence to external temperature may lead to a prediction of a change in the HVAC system, thereby adjusting monitoring (e.g., changing configuration of logging or how often which data is collected) of the HVAC system by the active monitoring service 202. Additionally, the machine learning component 206 may provide predictions based on an age of a system. For example, if a system is over a threshold age wherein maintenance may be demanded, the machine learning component 206 may recommend maintenance or more frequent monitoring of the system. Thus, efficiency (e.g., computational efficiency) may be further increased by monitoring systems based on predictions from the machine learning component 206.

For example, the machine learning component may detect a larger number of changes in a first system than a second system over a period of time (e.g., due to recent update or detected anomaly) and predict that another change may occur in the first system. In response, the active monitoring service 202 may monitor the first system (e.g., system with a greater rate of change) more regularly than the second system. Additionally or alternatively, the active monitoring service may change a configuration of the first system to include more thorough data logging thereof, therefore aiding in detecting the change.

Further, the operational conditions of the machine may be used by the machine learning component 206 to optimize inventory collection. For example, operational conditions associated with high computing power demands may lead to the machine learning component to prioritize inventory collection as described above. Additionally, operational conditions may be used to determine times wherein computational load is low. For example, if the machine is used less (e.g., some systems turned off, not used by an operator, connected to fewer external machines, etc.) during a window of time each day, more inventory (e.g., full inventory) may be collected during that window on a daily basis, while less comprehensive inventory (e.g., partial inventory) may be collected during times with generally high intensity operational conditions.

Further still, the machine learning component 206 and the active monitoring service 202 may account for network traffic and time inventory collections when it is less likely (e.g., according to the machine learning component 206 model) that inventory collection may compete with other machine functions for computing power, thereby increasing speed of inventory collection. Further still, the machine learning component 206 and the active monitoring service 202 may account for battery charge and for some types of machines (e.g., electric or hybrid vehicle, or other machine including a rechargeable battery), whether the machine is plugged in and charging the battery. For example, when the battery charge is lower, the active monitoring service may monitor fewer machine systems to conserve battery power, with the fewer systems selected based on the machine learning component 206. Additionally or alternatively, fewer notifications of active monitoring events may be provided to the client 208, thus reducing inventory collections initiated and thereby reducing computing power and bandwidth demands.

Upon receiving notification of the active triggering event (e.g., one or more changes in a state of the machine 204), the client 208 may request information from the machine 204. The machine 204 may respond by sending the requested information to the client 208, as indicated by arrow 508. After receiving the requested information, the client 208 may communicate the requested information to the server 212, as indicated by arrow 510. Finally, the server 212 may use the requested information to update the digital twin 214 to reflect the current state of the machine 204, as indicated by arrow 512. In some examples, the machine learning component 206 may also provide information (e.g., predictions of maintenance demands) directly to the server 212, as indicated by arrow 514.

An example of the machine learning component 206 is shown in FIG. 6. Training inputs 602 of the machine learning component 206 may include active triggering events 610, wherein the active triggering events 610 are changes in machine systems (e.g., of the machine 204 of FIGS. 2, 4, and 5) monitored by the active monitoring service (e.g., the active monitoring service 202 of FIGS. 2 and 5). Concurrently with notifying the client (e.g., the client 208 of FIGS. 2, 4, and 5) of an active triggering event 610, the active monitoring service may feed the active triggering event 610 to the machine learning component 206 as one of the training inputs 602. Thus, an identification and prediction algorithm 606 may learn from active triggering events 610 which trigger full or partial inventory collection. Training inputs 602 may also include passive triggering events 612, in some examples.

For example, some events and combinations of events (e.g., active triggering events and/or passive triggering events) may be designated as having high chances of prompting an inventory update (e.g., partial or full inventory collection). Additionally, other events and combinations of events may be designated as having low chances of prompting an inventory update. The events and combinations of events with associated chances of prompting inventory update may be fed to the model for training (e.g., as training inputs 602). In this way, upon occurrence of any event or combination of events, the machine learning component 206 may generate a likelihood of an update to an inventory item. The likelihood may be used to evaluate whether to request inventory collection of the inventory item.

Further, training inputs 602 may include other information 614 not related to triggering events. For example, states of the machine not monitored by the active monitoring service or the passive event service may be fed as training inputs 602. In other words, the machine learning component 206 may learn from more systems than just those monitored by the active monitoring service. Further still, the machine learning component 206 may learn from operational conditions of the machine when events occur. Operational condition parameters (e.g., temperatures, speeds, battery charge, external etc.) may be connected to certain events and fed to the machine learning component 206 as training inputs 602. For example, a parameter or combination of parameters changing (e.g., exceeding a predetermined value or changing faster than a predetermined rate) may be designated as having a high chance of preceding a specific event. The identification and prediction algorithm 606 may learn from the parameter (or combination of parameters) and associated likelihoods of subsequent events. In this way, the machine learning component 206 may produce predictions 616 based upon operational conditions of the machine.

When an active triggering event is detected, the passive monitoring service may request identification of the detected active triggering event 604. The identification and prediction algorithm 606 may provide a model for identifying an active triggering event and generating a prediction (e.g., of active triggering events and maintenance). The identification and prediction algorithm 606 may learn from patterns of active triggering events 610, passive triggering events 612, and other information 614 to be able to produce an identification 608 and prediction 616.

The identification 608 may include identifying relevant inventory elements for the client to request according to the detected active triggering event 604. As described above, the active triggering event 604 may comprise one or more changes in machine systems and the machine learning component 206 may aid in determining the number of changes for optimal inventory collection (e.g., balance of fastest updates to changes in inventory with the lowest computing power and bandwidth demands). The predictions 616 may include predictions of maintenance demands, subsequent active triggering events, and other predictions pertaining to the inventory management system 200 and the machine (e.g., machine 204 of FIG. 2) implementing the inventory management system. The predictions 616 may further increase computational efficiency of inventory management. For example, by more intelligently gathering inventory to exclude elements not changed since a prior inventory collection, bandwidth demanded for inventory collection may be reduced.

Turning to FIG. 7, an exemplary method 700 is shown for a system such as the system of FIG. 1 using an inventory management system in accordance with one or more embodiments of the present disclosure (e.g., the inventory management system of FIG. 2) to update machine software. An original equipment manufacturer (OEM) system may be communicatively coupled to a client of the inventory management system via OTA connection and configured to prepare a software update package for the machine according to the inventory collected by the inventory management system.

The method 700 begins at 702, wherein updated inventory of a machine is retrieved using an active monitoring service and a digital twin of the machine is synchronized using the updated inventory. For example, the method 300 of FIG. 3 may be employed by the machine computing system. As such, 702 may include the active monitoring service actively monitoring a plurality of machine systems and detecting an active triggering event (e.g., one or more detected changes to the plurality of machine systems). In response to the active triggering event, a client may trigger a partial or full inventory collection. The collected inventory may be communicated by the client to a server. The server may update a digital twin of the machine using the collected inventory, thereby synchronizing the digital twin with the machine. 702 may further include awaiting a passive triggering event and in response to the passive triggering event, triggering a full inventory collection, and providing collected inventory to the client. Detecting the active triggering event may include a machine learning component identifying the active triggering event and relevant inventory to be collected in the partial or full inventory collection. Accessing the machine learning component model may optimize retrieval of inventory according to in-machine bandwidth, battery charge, and a current state of the machine. Actively monitoring the plurality of machine systems may comprise continuous or periodic monitoring, depending on a system type and a likelihood of a change occurring in the system type according to a model of a machine learning component. The machine learning component may be configured to learn from the active triggering event and optimize machine inventory collection.

The method 700 proceeds to 704, wherein a software update package is prepared according to the updated inventory. The software update package may be tailored to a current state of the machine software, hardware, and containers to ensure proper function of the machine with the software update package. An OEM may prepare the software update package, for example.

The method proceeds to 706, wherein a simulation of the software update package on the digital twin is performed. For example, simulating the software update package on the digital twin may confirm the software update package is compatible with the current state of the machine. Synchronizing the digital twin in real-time or near real-time at 702 ensures an accurate representation of the current state of the machine for such a purpose. The digital twin may be accessible by one or more OEMs for performing simulations, analysis, and the like.

The method proceeds to 708, wherein the software update package is installed to the machine. For example, the software update package may be retrieved OTA from the OEM to the client (e.g., client 148 of FIG. 1 or client 208 of FIGS. 2, 4, and 5), and installed by a software installer such as the software installer 112 of FIG. 1. The method 700 ends following 708.

The technical effect of the inventory management system disclosed herein is to ensure inventory is up to date in real-time or near real-time and increase efficiency of inventory collection by responding to both passive triggering events and active triggering events. By prompting partial inventory collection based on an active triggering event, reduced inventory data may be transmitted, thereby increasing efficiency by reducing redundancy in inventory data updates. Further, inventory may be updated more often due to the active monitoring of machine (e.g., vehicle) systems responding directly to changes as they occur. Thus, inventory may be more accurate and a digital twin of the machine may be a closer replica of the machine in digital form. Further still, a machine learning component may further enhance the response of the active monitoring service by providing a model based on prior events of the inventory management system. In this way, a software update package may be prepared according to the inventory and simulated on the digital twin to ensure compatibility with the current state of the machine.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable machine and/or combination of machines. The methods may be performed by executing stored instructions with one or more logic machines (e.g., processors) in combination with one or more additional hardware elements, such as storage machines, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," and so on. are used merely as labels, and are not intended to impose numerical requirements or a particular positional order on their objects. The following claims particularly point out subject matter from the above disclosure that is regarded as novel and non-obvious.

The invention claimed is:

1. A system, comprising:

a vehicle including a computing system comprising a processor and a memory;

an active monitoring service of the computing system of the machine configured to monitor the memory and controller area network (CAN) traffic of the computing system, detect active triggering events of the vehicle in real-time, and in response notify a client of the computing system of the vehicle of the active triggering events, wherein the client is configured to initiate a partial or full inventory collection in response to receiving notification of an active triggering event, and the client is further configured to determine an extent of the inventory collection based on the active triggering event;

a server external to the vehicle and communicatively coupled to the client via over the air (OTA) connection; and a digital twin, wherein the digital twin is a digital replica of the vehicle synchronized to the vehicle via the server by data collected from the partial or full inventory collection.

2. The system of claim 1, wherein the active triggering event comprises one or more changes in one or more of hardware, software, or containers of the vehicle.

3. The system of claim 1, wherein the system further comprises a machine learning component configured to learn from the active triggering events and provide a model for the active monitoring service to optimize monitoring according to a current state of the machine, bandwidth, and computing power.

4. The system of claim 3, wherein the machine learning component is communicatively coupled to the server.

5. The system of claim 1, wherein the system further comprises a passive event service configured to await passive triggering events and notify the client of the passive triggering events, and wherein the client is further adapted to initiate a full inventory collection in response to receiving notification of a passive triggering event.

6. The system of claim 3, wherein the system further comprises an original equipment manufacturer (OEM) system communicatively coupled to the client via OTA connection and configured to prepare a software update package for the vehicle according to the data.

7. The system of claim 1, wherein the digital twin is accessible by one or more original equipment manufacturers.

8. The system of claim 1, wherein a partial inventory collection collects a portion of available inventory, the portion including inventory data that has changed since a prior inventory collection and excluding inventory data that has not changed since the prior inventory collection, and a full inventory collection collects all of the available inventory.

* * * * *